United States Patent [19]

Collman

[11] 4,073,778

[45] Feb. 14, 1978

[54] CROWN ETHER ACTIVATED LACTAM POLYMERIZATION

[75] Inventor: James P. Collman, Stanford, Calif.

[73] Assignee: Chevron Research Company, San Francisco, Calif.

[21] Appl. No.: 693,578

[22] Filed: June 7, 1976

[51] Int. Cl.$^2$ .............................................. C08G 69/20
[52] U.S. Cl. ................................. 260/78 L; 260/78 P; 260/239.3 R; 260/326.5 FL
[58] Field of Search ............................ 260/78 P, 78 L

[56] References Cited

U.S. PATENT DOCUMENTS

| | | | |
|---|---|---|---|
| 3,308,099 | 3/1967 | Mermoud et al. | 260/78 L |
| 3,408,335 | 10/1968 | van Mourik et al. | 260/78 L |

*Primary Examiner*—Harold D. Anderson
*Attorney, Agent, or Firm*—D. A. Newell; T. G. DeJonghe; L. S. Squires

[57] ABSTRACT

The anionic polymerization of lactam is activated by the presence of crown ethers which are macrocyclic polyethers having the ability to form stable complexes with salts.

22 Claims, No Drawings

CROWN ETHER ACTIVATED LACTAM POLYMERIZATION

BACKGROUND OF THE INVENTION

Polylactams such as poly-2-pyrrolidone (Nylon-4) and polycaprolactam (Nylon-6) are produced by the anionic (alkaline-catalyzed) polymerization of the lactam. The catalyst is believed to comprise a lactamate produced by the reaction of a lactam with an alkali metal, or quaternary ammonium hydroxide, or a source of alkali or alkaline earth metal, such as the hydroxide or alkoxide. The reaction product is believed to be a lactamate, e.g., a salt such as potassium pyrrolidonate, the product of the reaction between potassium and 2-pyrrolidone,

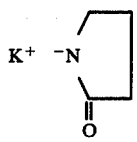

the salt consists of a cationic species such as $K^+$, $Na^+$, $Ca^{++}$, $NR_4^+$, etc., depending upon the source of the catalyst, and an anionic species which may be a pyrrolidonate ion, a caprolactamate ion, etc., depending upon the choice of lactam. Polymerization initiators and/or activators are also present during the polymerization reaction.

The macrocyclic polyethers are neutral compounds containing 4–20 oxygen atoms each separated from the next by two or more carbon atoms. Macrocyclic polyethers have been found to form stable complexes with salts of alkali metals and other metals and ammonium salts; "Macrocyclic polyethers and their complexes", C. J. Pederson et al, ANGEW, CHEM. Internat. Edit., Vol. 11, page 16, (1972); and U.S. Pat. Nos. 3,562,295 and 3,687,978. The macrocyclic polyethers are believed to form salt-polyether complexes in which the cation is encircled by the oxygen atoms of the polyether ring and is held there by the electrostatic attraction between the cation and the negative ends of the CO dipoles. Since the stereo models of macrocyclic polyethers give a crown-like appearance, they are commonly designated as [N]-crown-M polyethers, wherein N is the total number of atoms in the polyether ring and M is the number of oxygen atoms in the polyether ring.

The crown polyethers ranging in size from cyclic tetramers of ethylene oxide ([12]-crown-4) and propylene oxide ([16]-crown-4) to 60-membered polyether rings (dibenzo[60]-crown-20) have been reported. The most effective complexing agents are said to be found among those polyethers containing 5–10 oxygen atoms each separated from the next by two carbon atoms.

BRIEF SUMMARY OF THE INVENTION

The process for the anionic polymerization of lactam wherein a catalytically effective amount of a macrocyclic polyether, [N]-crown-M, is present; N=12–30 represents the number of atoms in the polyether ring and M=4–10, represents the number of oxygen atoms in the polyether ring. The complex consisting of said polyether and an alkali metal lactamate in 1:1 molecular ratio.

DESCRIPTION OF PREFERRED EMBODIMENTS OF THE INVENTION

The anionic (alkaline catalyzed) polymerization of lactams is activated by the inclusion of catalytically effective amounts of macrocyclic polyethers. The macrocyclic polyethers are believed to form 1:1 complexes with the lactamate salt catalyst by interacting strongly with the cationic species of the salt.

Macrocyclic Polyether

The macrocyclic polyethers of the present invention encompass those cyclic compounds consisting of from 4 to about 10 —O—X— units wherein O is oxygen and X in each of said units is independently selected from:

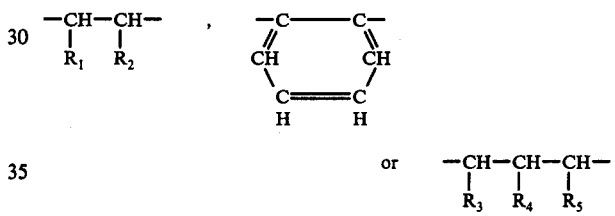

wherein $R_1$, $R_2$, $R_3$, $R_4$ and $R_5$ are radicals independently selected from hydrogen, or $C_1$–$C_4$ alkyl, or $R_1$ and $R_2$ are linked together to form a cyclohexylene group. Preferably, $R_1$–$R_2$ are hydrogen or $C_1$–$C_4$ alkyl groups. More preferably, $R_1$–$R_5$ are hydrogen, or $C_1$–$C_2$ alkyl groups, and most preferably they are hydrogen. These macrocyclic polyethers of the present invention are most simply defined as [N]-crown-M wherein N, representing the number of atoms in the polyether ring, is 12–30 and M, representing the number of oxygen atoms in the polyether ring, is 4–10. Each oxygen atom in the ring is separated from its adjoining oxygen atoms by two or three carbon atoms. Examples of these polyethers under several common name designations are given as follows:

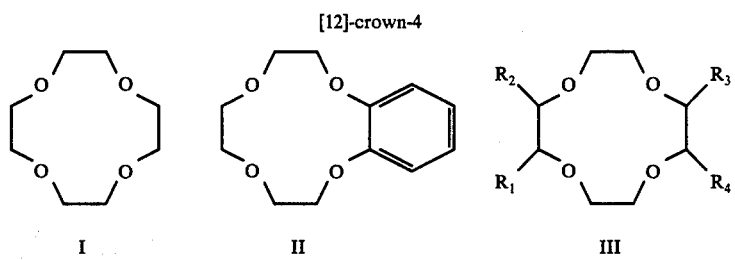

[12]-crown-4

[14]-crown-4

-continued

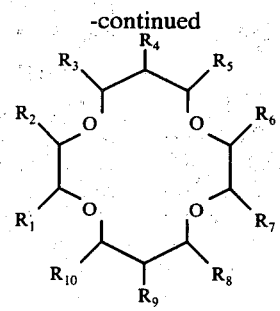

IV

[18]-crown-6

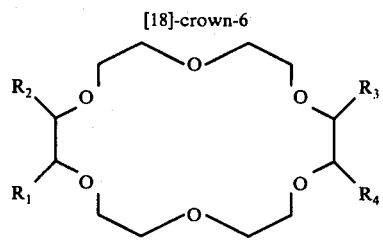

V

As used herein, unless otherwise indicated, [12]-crown-4 denotes Polyethers I–III and other macrocyclic polyethers having 12 polyether ring atoms, 4 of which are oxygen atoms separated from each other by 2-3 carbon atoms.

Polyether I is a [12]-crown-4 macrocyclic polyether which is a cyclic tetramer of ethylene oxide; 1,4,7,10-tetraoxacyclododecane.

Polyether II is a [12]-crown-4 macrocyclic polyether more uniquely named simply benzo [12]-crown-4 and unambiguously named under the applicable IUPAC rules 7,10,13,16-tetraoxabicyclo[10.4.0]hexadeca-1(2),3,5-triene.

Polyether III is also a [12]-crown-4 macrocyclic polyether illustrating the use of 4 —O—X— units wherein X is —CH($R_1$)—CH($R_2$)— or a phenylene group. If $R_1$, $R_2$, $R_3$ and $R_4$ are hydrogen, Polyether III becomes equivalent to Polyether I. If $R_3$ and $R_4$ are linked to form a cyclohexylene group, and the cyclohexylene group is dehydrogenated, then Polyether III becomes equivalent to Polyether II. If each of the R groups is linked to form a cyclohexylene broup and the cyclohexylene groups are dehydrogenated, the resulting compound is dibenzo[12]-crown-4, or 2,5,12,15-tetraoxatricyclo[14.4.0.0$^{6,11}$] eicosa-1(16),6(7),8,10,17,19-hexene. If each of the R groups is linked to form a cyclohexylene group, the resulting tricyclomacrocyclic Polyether III is diperhydrobenzo[12]-crown-4 or dicyclohexyl[12]-crown-4, or 2,5,12,15-tetraoxatricyclo[14.4.0.0$^{6,11}$] eicosane.

Polyether IV is a [14]-crown-4 macrocyclic polyether. If all the R substituents are hydrogen, it is 1,5,8,12-tetraoxacyclotetradecane. Polyether IV consists of 4 —O—X— units wherein two X groups are —CH($R_1$)CH($R_2$)— and two X groups are —CH($R_3$)CH($R_4$)CH($R_5$)— groups. If $R_1$, $R_2$, $R_6$ and $R_7$ are linked to form cyclohexylene groups, Polyether IV is dicyclohexyl[14]-crown-4, or 2,6,13,17-tetraoxatricyclo[16.4.0.0$^{7,12}$]docosane.

As used herein, unless otherwise indicated, [18]-crown-6 denotes Polyether V and all macrocyclic polyethers having 18 polyether ring atoms, 6 of which are oxygen atoms separated from each other by 2-3 carbon atoms. Polyether V is a [18]-crown-6 macrocyclic polyether having 6 —O—X— units wherein four units have only hydrogen substituents. If in the remaining two units all the R substituents are hydrogen, the polyether is 1,4,7,10,13,16-hexaoxacyclooctadecane. But, if the two remaining units have the R substituents linked to form cyclohexylene groups, the polyether is dicyclohexyl[18]-crown-6, or 2,5,8,11,14,17-hexaoxatricyclo[20.4.0.0$^{11,16}$]hexacosane. Alternatively, the R substituents may be linked to form dibenzo[18]-crown-6.

In general, the macrocyclic polyethers of the present invention encompass all the polyethers taught in U.S. Pat. Nos. 3,687,978 and 3,562,295 which are catalytically effective in the anionic polymerization of lactam. In general, these crown-ethers are those described above; preferably those having N equal 12–18 and M equal 4–6 and most preferably those having N equal 15–18 and M equal 6. A preferred class of crown ether polymerization activators are macrocyclic polyethers selected from tetra, penta and hexaoxacyclo ($C_8$–$C_{30}$) alkanes or alkenes containing a 12–18 membered polyether ring. Other rings, if any, present in this class of crown ethers are $C_6$ aromatic rings, e.g., dibenzo[18]-crown-6.

The macrocyclic polyethers are synthesized by known methods. A recent reference is G. W. Gokel et al, *J. Org. Chem.*, Vol. 39, page 2445 (1974). In general, a linear polyether having halide and alkoxide functions at opposite ends yields the macrocyclic polyether by ring closure; or two linear polyethers, each terminally functionalized as above, can be joined to form a ring. Catechol is used to introduce phenylene groups into the polyether. Saturated ethers are prepared from the corresponding aromatic ones by catalytical hydrogenation.

Polymerization Conditions

The polymerization process of this invention is applicable to the polymerization of lactams under anionic polymerization conditions, i.e., alkaline catalyzed polymerization. It is specifically applicable to the polymerization of 5-7 membered-ring lactams, principally the polymerization of epsilon-caprolactam to polycaprolactam (nylon-6) and the polymerization of 2-pyrrolidone to poly-2-pyrrolidone (nylon-4). The process is specifically preferred for the polymerization of 2-pyrrolidone to form a polymeric carbonamide of high molecular weight in good yield in a reasonably short polymerization time. The polymer is capable of being melt-spun into filaments having substantial orientation along the filamentary axis, high-tensile strength and other properties suitable for making into textiles. It can be made into shaped articles and film by melt-molding or extrusion.

In the anionic polymerization of this process the catalyst is believed to comprise a lactamate salt. The salt is believed to be formed by the reaction of the lactam with a compound having an alkaline reaction, such as an alkaline metal hydroxide, an alkaline earth metal hydroxide, an alkali metal alkoxide, an alkali metal, etc. Preferably, an alkali metal, or a source of alkali metal or alkaline earth metal is used. Most preferably, an alkali metal hydroxide such as potassium or sodium hydroxide is used, and potassium hydroxide is most preferred.

The lactamate salt is added in a catalytically effective amount, usually at about 0.5-30 mol percent, preferably about 1-20 mol percent based on total monomer, to the lactam for polymerization reaction. In the present invention, a catalytically effective amount, usually about 0.5-10 mol percent, preferably about 1-8 mol percent based on total monomer, of a macrocyclic polyether, [N]-crown-M, is also present during the polymerization, wherein N is equal to 12-30 and M is equal to 4-10. Preferably the mol ratio of lactamate cation to polyether is about 1:0.2-1.4, most preferably about 1:0.4-1.0.

The catalytic effect of the macrocyclic polyethers is thought to be due to their ability to form complexes with salts, specifically, the lactamate salt of the present catalytic process. The complex is believed to be stabilized by encirclement of the cation of the catalyst by the oxygen atoms of the polyether ring. 1:1 salt to polyether, and other stoichiometric complexes, have been reported, C. J. Pederson, *J. Amer. Chem. Soc.* 92, page 386 (1970). Specific ranges of M, the number of oxygen atoms in the polyether ring, and N, the number of atoms in the polyether ring, are said to optimize the stability of 1:1 complexes depending upon the diameter of the cation and the diameter of the macrocyclic polyether ring. However, while the [18]-crown-6 and [15]-crown-5 are believed to be preferred for their reported affinity for $K^+$ and $Na^+$ respectively, the choice of a particular polyether as activator of the anionic polymerization in the presence of a given cationic species of the catalyst depends on the polymerization results achieved.

In a preferred embodiment of the invention, an alkali metal hydroxide is added to excess 2-pyrrolidone in an amount from 0.5-30 mol percent, preferably about 1-20 mol percent and most preferably about 10 mol percent based on total monomer. Total monomer consists of the 2-pyrrolidonate catalyst, 2-pyrrolidone provided as solvent for the catalyst, 2-pyrrolidone catalyst having formed an adduct or complex with an activator or initiator, and any additional monomer charged to the reactor. The alkali metal hydroxide reacts with 2-pyrrolidone to form a solution of alkali metal pyrrolidonate and water in 2-pyrrolidone. The solution is dehydrated until it contains less than about 0.1-0.2 weight percent water. Carbon dioxide, or sulfur oxide, preferably carbon dioxide, is then added in an amount corresponding to about 5-80, preferably 10-50 mol percent of the alkali metal 2-pyrrolidonate present in solution. The dioxide is believed to function as an initiator or activator of polymerization. The [N]-crown-M polyether is then added in a catalytically effective amount. The polyethers may be used as a single species or as a combination of several species of crown ethers. On the other hand, additional initiators and/or activators may be present in small amount, such as, in addition to carbon dioxide, a small amount of acetic anhydride, or N-acyl lactamate, in amounts of about 0.05-1.5 mol percent. In the most preferred embodiment, the crown ether is added with the hydroxide before dehydration. This procedure was found to give an appreciable increment in percent conversion and molecular weight over a procedure in which the crown was added *after* dehydration.

In general, 2-pyrrolidone may be polymerized at a temperature from about 15° C to about 100° C, preferably 25° C to 70° C, and most preferably from about 40° C to about 60° C, under a pressure ranging from subatmospheric to superatmospheric, in the presence of the catalyst for a period of from about 4 to about 100 hours or longer, preferably from 8 to about 72 hours, and most preferably from 8 to about 48 hours. In general, polymerization conditions for the other readily polymerizable lactams are well known in the art.

In order to produce high-quality poly-lactam capable of being formed into fibers, filaments and yarn of commercial textile quality, it is necessary that the lactam be of high purity. Depending upon the process of manufacture, commercially available lactams such as 2-pyrrolidone may contain appreciable amounts of various impurities, some of which are believed to interfere deleteriously with polymerization. Purification of the monomer to polymerization grade is achieved by known purification techniques, including distillation.

The process of the present invention is just as applicable to the production of polymers of C-alkyl-substituted lactams, such as 4-methyl-2-pyrrolidone and copolymers of the lactams, such as the copolymer of 2-pyrrolidone with caprolactam, as to the production of polylactams. Consequently, in general, and unless otherwise indicated, "monomer" denotes lactam, or 2-pyrrolidone, substituted lactams and substituted-2-pyrrolidones, and any compound capable of polymerizing as a lactam or a copolymerizating with a lactam under the stated conditions of alkaline polymerization catalysis.

Preparation of polymers of lactams, according to the normal process of this invention, can be carried out with various amounts of monomers, catalysts, inert nonsolvent liquids, initiators and other additives — the amount of each being properly coordinated to produce the most effective polymerization. Polymerization may be carried out in bulk or solution or dispersion, with stirring or without stirring, with inert nonsolvents, or without same, as benefits the particular polymerization reaction. Although the preferred amounts of the components, polymerization times, and polymerization temperatures in the reaction have been given, it is understood that these are not intended to be limitations to polymerization since it may be possible to achieve substantial polymerization outside the preferred ranges.

Exemplification

The macrocyclic polyethers of the present invention have a remarkable effect on lactam polymerization. The rate of polymerization increases as shown in the tables, in many instances, without sacrifice of the weight average molecular weight of the product polymer. That is, the rate increase is not achieved at the expense of decreased molecular weight of the polymer product as is so often found in the addition of other polymerization initiators and/or activators.

The crown ethers have a favorable effect on nylon-4 polymerization, several were found to have a large rate-accelerating and molecular weight-increasing effect on the polymerization of pyrrolidone. For example, [18]-crown-6 provided a 12-fold increase in percent conversion after 8 hours (see Tables I and II). It was found that diglyme, $CH_3OCH_2CH_2OCH_2CH_2OCH_3$, an open chain polyether analogous to the crown ethers, provides no appreciable advantage in a full 22 hour polymerization over no polyether (see Tables I and II).

The effect of concentration of [18]-crown-6 on polymer conversion and weight average molecular weight was studied; the results are summarized in Table III. There is a maximum to both percent conversion and molecular weight in the range of a mol ratio of potassium:polyether of about 1:0.2–1.4, preferably about 1:0.4–1.0, and most preferably about 1:0.7. Example 4 and Table IV show the effect of adding the crown ether before or after dehydration of the catalyst solution.

EXAMPLE 1

A flask equipped with a distillation head was charged with 200 g (2.35 mols) of 2-pyrrolidone and 3.1 g (0.047 mol) of 85.5% KOH. The flask was heated to 115° C at 2.5 mm for 13 minutes to remove water. To this 2 mol percent catalyst in 2-pyrrolidone solution was added sufficient carbon dioxide to provide 0.3 mol carbon dioxide per mol of potassium. The resulting solution was added to polyethylene bottles in about 12-g portions. Some of the bottles contained crown ethers in the amount, and of the type, shown in Table I. Each bottle was shaken well and placed in an oven for 8 or 22 hours. At the end of that time, the bottle was cooled, cut open and the product ground up. Unreacted monomer was extracted with water. The crown ether was extracted with chloroform. After drying, the polymer was weighed and its viscosity determined. The results are given in Table I.

EXAMPLE 2

A flask equipped with a distillation head was charged with 200 g (2.35 mols) of 2-pyrrolidone and 1.92 g (0.047 mol) of 98.2% NaOH. The flask was heated to 110° C at 1.0 mm for 30 minutes to remove water. To this 2 mol percent catalyst in 2-pyrrolidone solution was added sufficient carbon dioxide to provide 0.3 mol carbon dioxide per mol of sodium. The resulting solution was added to polyethylene bottles in about 12 g portions. Some of the bottles contained crown ethers in the amount, and of the type, shown in Table II. Each bottle was shaken well and placed in an oven for 8 or 22 hours. At the end of that time, the bottle was cooled, cut open and the product ground up. Unreacted monomer was extracted with water. The crown ether was extracted with chloroform. After drying, the polymer was weighed and its viscosity determined. The results are given in Table II.

EXAMPLE 3

The procedure of Example 1 was repeated except the polyethylene bottles contained various amounts of [18]-crown-6 as shown in Table III. The results are given in the Table.

EXAMPLE 4 a. A flask was charged with 50 g (0.59 mol) of 2-pyrrolidone, 0.78 g of 85.5% potassium hydroxide and 3.0 g (0.0083 mol) of dibenzo[18]-crown-6. The mixture was heated to 112° C at 2 mm for 9 minutes to remove water. Carbon dioxide was then added. The mixture was poured into a polyethylene bottle which was held at 50° C for 22 hours. The resulting polymeric product was worked-up as described in previous examples.

b. The same experiment was repeated using 2.19 g (0.0083 mol) of unsubstituted [18]-crown-6 in place of the dibenzo[18]-crown-6. The results of these examples are given in Table IV, along with analogous examples wherein the crown ether was added after dehydration and just prior to polymerization. The data show that both both conversion and molecular weight are higher when the crown ether is added prior to dehydration.

All molecular weights are reported as the weight average molecular weight determined from the specific viscosity of 0.1 g of polymer/100 cc of m-cresol solution at 25° C. All reported percentages are mol percent unless otherwise indicated. Percent conversion is calculated as 100 × (weight of polymer)/(weight of total monomer) and total monomer has been defined heretofore.

TABLE I

| | Effect of Crown Ethers on Nylon Polymerization[a] | | | |
|---|---|---|---|---|
| Example | Crown Ether, Mol % | Mol Ratio K:Crown | Percent Conversion | $\overline{M}_w \times 10^{-3}$ |
| | | | 8 Hours | |
| 1a | None | — | 2.4 | 175 |
| 1b | [18]-crown-6, 1.5 | 1:0.77 | 28.9 | 365 |
| 1c | DBZ-[18]-crown-6, 1.5 | 1:0.77 | 10.4 | 225 |
| 1d | DCH-[18]-crown-6, 1.4 | 1:0.71 | 6.9 | 120 |
| 1e | [15]-crown-5, 1.4 | 1:0.71 | 16.3 | 160 |
| 1f | Diglyme, 1.4 | 1:0.71 | 8.3 | 105 |
| | | | 22 Hours | |
| 1g | None | — | 12.2 | 270 |
| 1h | [18]-crown-6, 1.4 | 1:0.71 | 55.0 | 440 |
| 1i | DBZ-[18]-crown-6, 1.5 | 1:0.77 | 30.7 | 320 |
| 1j | DCH-[18]-crown-6, 1.3 | 1:0.66 | 16.7 | 145 |
| 1k | [15]-crown-5, 1.5 | 1:0.77 | 25.1 | 175 |
| 1l | Diglyme, 1.5 | 1:0.77 | 13.0 | 155 |

[a]Pyrrolidone with 2 mol percent KOH and 0.6 mol percent $CO_2$. Polymerization at 50° C for times shown.
[b]DBZ = dibenzo, DCH = dicyclohexyl (see Polyether V)

TABLE II

Effect of Crown Ethers on Nylon Polymerization[a]

| Examples | Crown Ether, Mol % | Mol Ratio Na:Crown | Percent Conversion | $\bar{M}_w \times 10^{-3}$ |
|---|---|---|---|---|
| | | | 8 Hours | |
| 2a | None | — | 2.4 | 215 |
| 2b | [18]-crown-6, 1.4 | 1:0.71 | 10.6 | 250 |
| 2c | DBZ-[18]-crown-6, 1.5 | 1:0.77 | 9.2 | 170 |
| 2d | DCH-[18]-crown-6, 1.3 | 1:0.66 | 3.2 | 92 |
| 2e | [15]-crown-5, 1.2 | 1:0.59 | 10.7 | 160 |
| 2f | Diglyme, 1.3 | 1:0.66 | 5.5 | 112 |
| | | | 22 Hours | |
| 2g | None | — | 8.9 | 290 |
| 2h | [18]-crown-6, 1.2 | 1:0.59 | 19.9 | 270 |
| 2i | DBZ-[18]-crown-6, 1.3 | 1:0.66 | 25.7 | 370 |
| 2j | DCH-[18]-crown-6, 1.4 | 1:0.71 | 6.9 | 112 |
| 2k | [15]-crown-5, 1.3 | 1:0.66 | 17.4 | 170 |
| 2l | Diglyme, 1.3 | 1:0.66 | 9.9 | 175 |

[a]Pyrrolidone with 2 mol percent NaOH and 0.6 mol percent $CO_2$. Polymerization at 50° C for times shown.
[b]DBZ = dibenzo, DCH = dicyclohexl (see Polyether V).

TABLE III

Effect of Crown Ether Concentration on Nylon Polymerization[a]

| Example | [18]-crown-6[b] Mol Percent | Mol Ratio K:Crown | Percent Conversion | $\bar{M}_w \times 10^{-3}$ |
|---|---|---|---|---|
| 3a | 0 | 0 | 12.2 | 265 |
| 3b | 0.15 | 1:0.08 | 20.5 | 320 |
| 3c | 0.41 | 1:0.20 | 30.6 | 370 |
| 3d | 0.81 | 1:0.40 | 46.1 | 450 |
| 1h | 1.42 | 1:0.71 | 55.0 | 440 |
| 3e | 2.30 | 1:1.15 | 35.5 | 135 |
| 3f | 2.92 | 1:1.49 | 19.3 | 70 |

[a]Pyrrolidone with 2 mol percent KOH and 0.6 mol percent $CO_2$. 50° C polymerization for 22 hours.
[b]See Polyether V, $R_1$-$R_4$ are H.

TABLE IV

Effect of Order of Crown Ether Addition

| Example | Crown Ether | Conversion | $\bar{M}_w \times 10^{-3}$ |
|---|---|---|---|
| 1g | None | 12.2 | 270 |
| 4a | DBZ-[18]-crown-6 | 51.5 | 470 |
| 1i | " | 30.7 | 320 |
| 4b | [18]-crown-6 | 62.8 | 610 |
| 1h | " | 55.0 | 440 |

What is claimed is:

1. A process for the anionic polymerization of a lactam to a polylactam, capable of being made into filaments, films or shaped articles, which comprises polymerizing a mixture of lactam, anionic catalyst and a catalytically effective amount of a crown macrocyclic polyether having the ability to form complexes with said anionic catalyst and having 12-30 atoms in its polyether ring including 4-10 oxygen atoms and wherein said oxygen atoms are separated from each other by two or three carbon atoms.

2. The process of claim 1 wherein said lactam is a 5-7 membered-ring lactam and wherein the cationic of said anionic catalyst is selected from the group consisting of alkali metal ions and alkaline earth metal ions.

3. The process according to claim 2 wherein said cation is an alkali metal ion.

4. The process according to claim 3 wherein said alkali metal ion is $K^+$ or $Na^+$.

5. The process according to claim 3 wherein said alkali metal ion is $K^+$ or $Na^+$ and is derived from KOH or NaOH.

6. The process according to claim 3 wherein said alkali metal ion is derived from KOH.

7. The process according to claim 2 wherein said polyether has 12-18 atoms in the polyether ring including 4-6 oxygen atoms.

8. The process according to claim 2 wherein said polyether is [18]-crown-6.

9. The process according to claim 2 wherein said polyether is [15]-crown-5.

10. The process according to claim 8 wherein said polyether is dibenzo[18]-crown-6.

11. The process according to claim 2 wherein said anionic catalyst is present in an amount of from 1 to 20 mol percent based on total lactam.

12. The process according to claim 2 wherein said lactam is 2-pyrrolidone or epislon-caprolactam.

13. The process according to claim 12 wherein said lactam is 2-pyrrolidone and said anionic catalyst is a 2-pyrrolidonate.

14. The process according to claim 13 wherein said process is carried out in the presence of 10-50 mol percent $CO_2$ or $SO_2$ based on 2-pyrrolidonate catalyst.

15. The process according to claim 13 wherein said process is carried out in the presence of 10-50 mol percent $CO_2$ based on 2-pyrrolidonate catalyst.

16. The process according to claim 2 wherein said macrocyclic polyether is present in an amount of about 0.5-10 mol percent based on total lactam.

17. The process according to claim 2 wherein said polyether is present in mol ratio of said anionic catalyst to said polyether of 1:0.4-1.0.

18. The process of claim 1 for the anionic polymerization of a lactam wherein said macrocyclic polyether is selected from the group consisting of tetra-, penta-, and hexa-oxacyclo ($C_8$-$C_{30}$) alkanes or alkenes containing a 12-18 membered cycloether ring and mixtures thereof.

19. The process according to claim 18 wherein said polyether contains 1-5 rings, one of which is said 12-18 membered cycloether ring and the others, if any, are $C_6$ aromatic rings.

20. The process of claim 3 wherein said alkali metal is derived from an alkali metal hydroxide and wherein said process comprises the steps of contacting said lactam with said alkali metal hydroxide and said macrocyclic polyether to form a mixture containing water and dehydrating said mixture.

21. A process for the anionic polymerization of a lactam to a polylactam, capable of being made into filaments, films, or shaped articles, which comprises polymerizing a mixture of lactam, anionic catalyst, and a catalytically effective amount of a crown macrocyclic polyether having from 12-30 polyether ring atoms and composed of from 4 to 10 units having the formula —OX—, wherein X in each of said units is independently selected from the group consisting of radicals having the formula

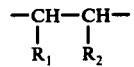 , 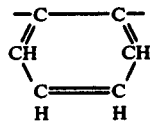

or  —CH—CH—CH—
    |   |   |
    R₃  R₄  R₅ wherein $R_1$ and $R_2$ are independently selected from the group consisting of hydrogen and $C_1$-$C_4$ alkyls or wherein $R_1$ and $R_2$ are linked together to form a cyclohexylene group; and $R_3$, $R_4$, and $R_5$ are independently selected from the group consisting of hydrogen and $C_1$-$C_4$ alkyls.

22. The process according to claim 21 wherein $R_1$-$R_5$ are independently selected from the group consisting of hydrogen and $C_1$-$C_4$ alkyl groups.